April 20, 1926. 1,581,377
J. W. BISHOP
PIN SETTING MACHINE
Filed June 29, 1925 4 Sheets-Sheet 1
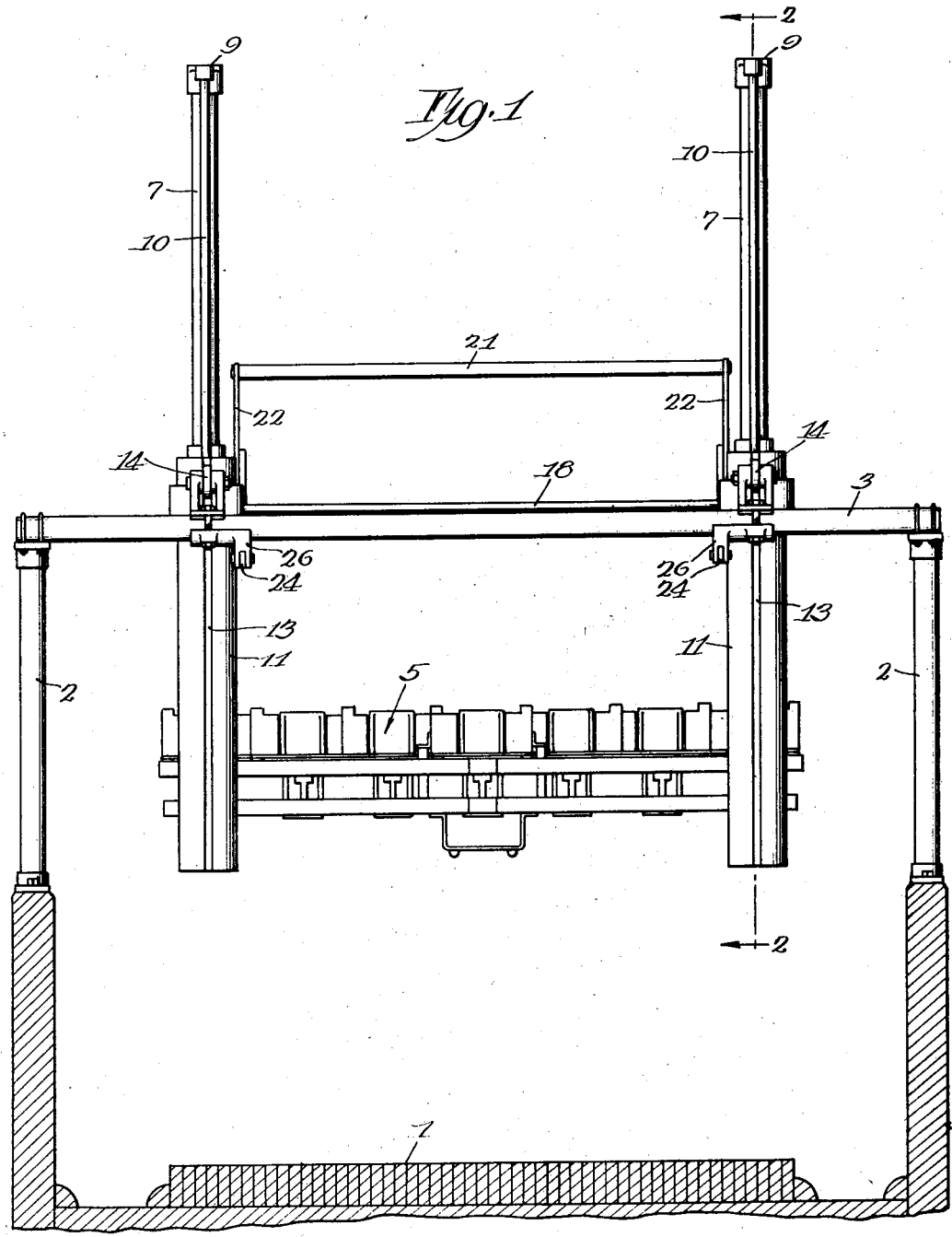

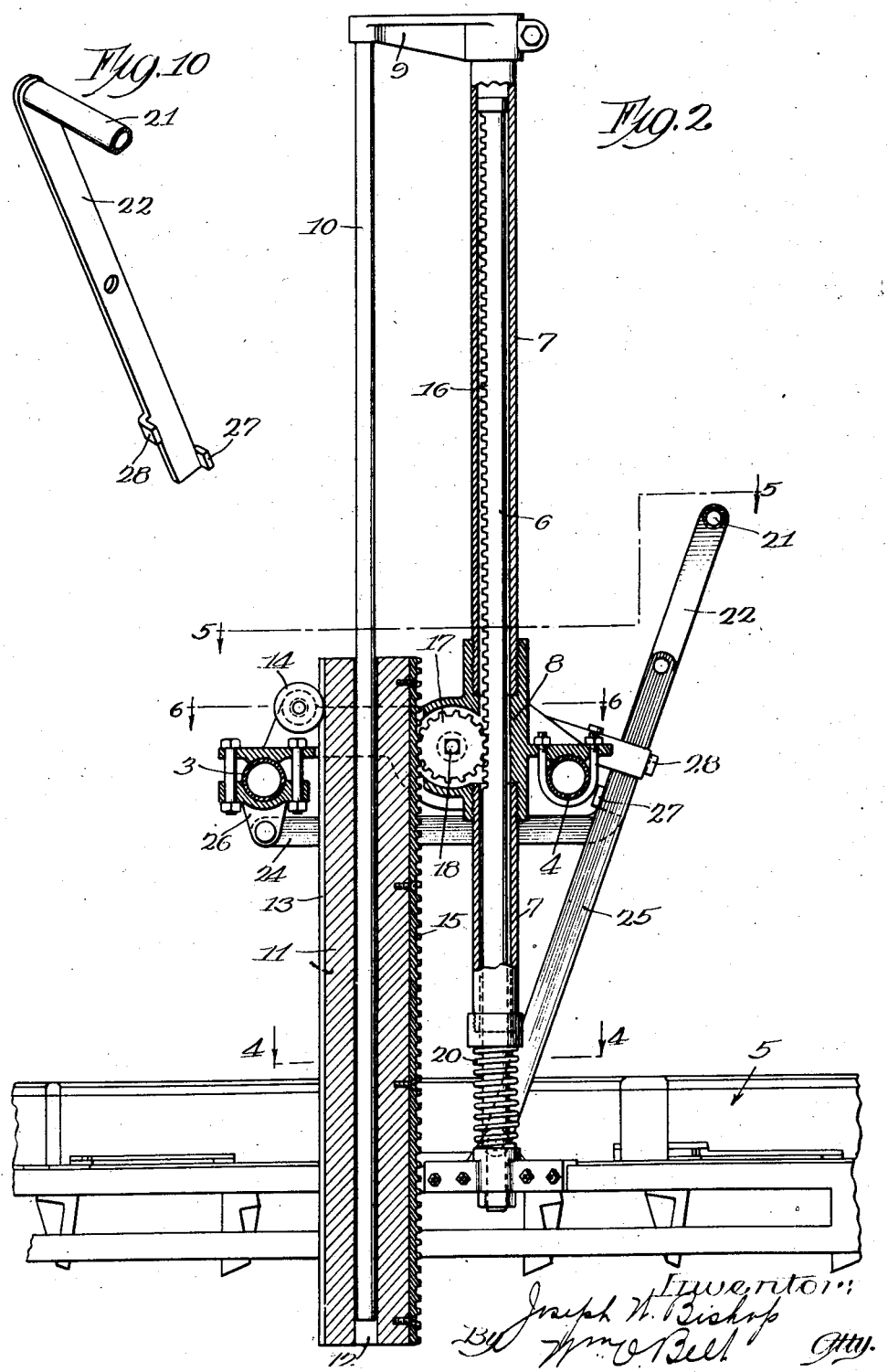

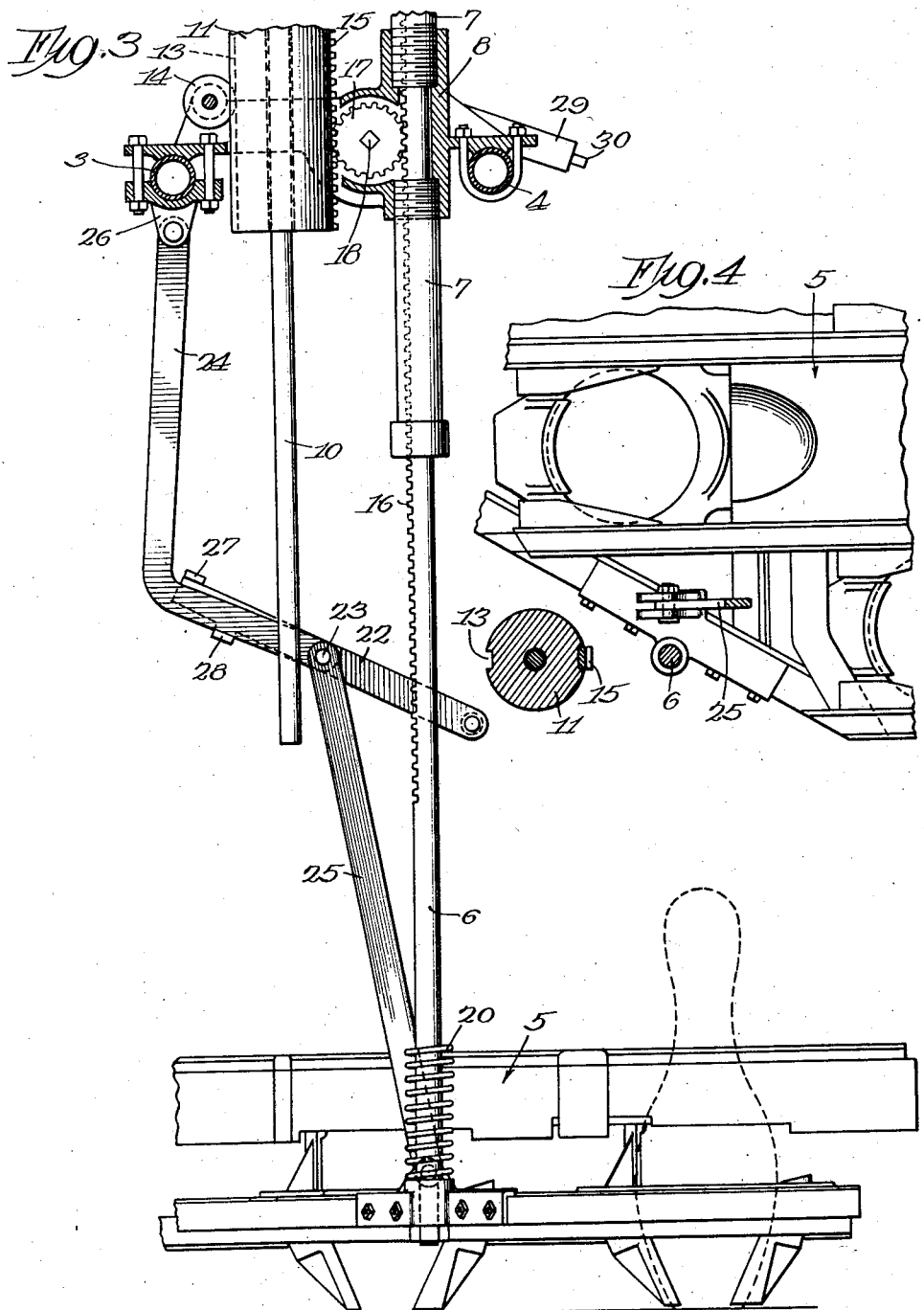

April 20, 1926.
J. W. BISHOP
PIN SETTING MACHINE
Filed June 29, 1925   4 Sheets-Sheet 4
1,581,377
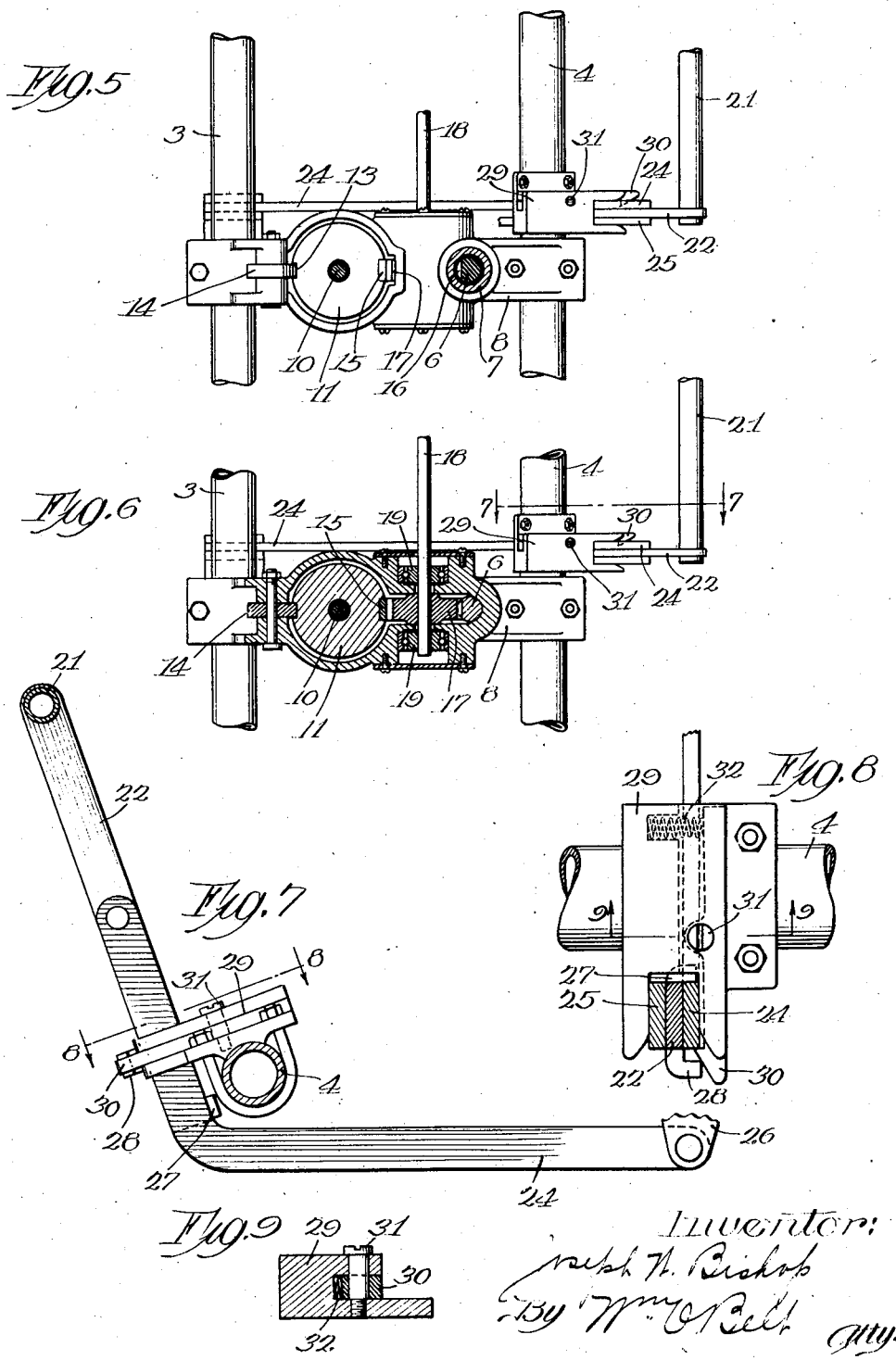

Patented Apr. 20, 1926.

1,581,377

UNITED STATES PATENT OFFICE.

JOSEPH W. BISHOP, OF MUSKEGON, MICHIGAN, ASSIGNOR TO THE BRUNSWICK-BALKE-COLLENDER COMPANY, OF WILMINGTON, DELAWARE, A CORPORATION OF DELAWARE.

PIN-SETTING MACHINE.

Application filed June 29, 1925. Serial No. 40,133.

*To all whom it may concern:*

Be it known that I, JOSEPH W. BISHOP, a citizen of the United States, residing at Muskegon, in the county of Muskegon and State of Michigan, have invented certain new and useful Improvements in Pin-Setting Machines, of which the following is a specification.

Pin setting machines of the hand operated type have usually been controlled by a large counterweight connected to the setter frame by means of cables trained over pulleys arranged above the frame, the counterweight rising and falling as the setter frame is lowered or raised. This arrangement is unsightly and moreover is inefficient due to the fact that cables stretch. It is therefore the principal object of this invention to provide a pin setting machine operated by counterweights and which shall avoid the unsightly appearance of the old type and shall also be positive in operation so as to insure that the movement of the setter frame shall exactly equal that of the weights.

A further object of my invention is to provide novel and improved means for securing the setter frame in its uppermost position, which means is automatically released when the handle of the setter frame is moved downwardly in its normal manner, without necessitating a special unlocking operation.

In the accompanying drawings in which I have shown a selected embodiment of my invention;

Fig. 1 is a front elevation of a pin setting machine embodying my invention in position above an alley bed.

Fig. 2 is a section on the line 2—2 of Fig. 1.

Fig. 3 is a view of a portion of the parts shown in Fig. 2, but showing the arrangement thereof, when the setter frame is in its lowered position.

Fig. 4 is a section on the line 4—4 of Fig. 2.

Fig. 5 is a section on the line 5—5 of Fig. 2.

Fig. 6 is a section on the line 6—6 of Fig. 2.

Fig. 7 is a section on the line 7—7 of Fig. 6.

Fig. 8 is a section on the line 8—8 of Fig. 7.

Fig. 9 is a section on the line 9—9 of Fig. 8.

Fig. 10 is a detail perspective view of the means for connecting the handle to the means for lowering the setter frame.

Referring now to the drawings, I have shown at 1 an alley bed on the sides of which are arranged posts 2 supporting cross bars 3 and 4, the posts and cross bars forming a support for the setter frame 5 and the operating means therefor. The setter frame may be of any suitable type, but for the purpose of illustration, I have shown it as of the type described and claimed in my co-pending application Serial No. 16,332, filed March 18, 1925.

According to my invention the setter frame is adapted to be raised and lowered by means of vertical guide rods 6 secured to the frame and reciprocating within guide tubes 7. The guide tubes are secured to brackets 8 mounted on the cross bars 3 and 4 and on the upper ends of the guide tubes are mounted forwardly extending brackets 9 from which depend guide rods 10 arranged parallel to the guide tubes 7. Mounted on each guide rod 10 is a weight 11 which may be conveniently formed in the cylindrical shape illustrated in the drawings and which is provided with a central bore 12 within which the guide rod 10 is received. The forward face of each weight is provided with a groove 13 within which runs a guide roller 14, thus insuring that the weight will not rotate about its vertical axis during movement thereof.

The rear face of the weight is provided with a rack 15 and the front face of each guide rod 6 is also provided with a rack 16. Disposed in the brackets 8 are pinions 17 meshing with the racks 15 and 16 and mounted on a shaft 18 so as to rotate in unison. This arrangement forms an equalizer to insure that all parts shall operate in unison. The shaft 18 is preferably mounted in ball bearings 19, as shown in Fig. 6 to insure smooth, even operation of the device. Surrounding the lower end of each guide rod 6 is a spring 20, which acts as a buffer to engage the lower end of the corresponding guide tube 7 at the upper limit of the movement of the setter frame.

The setter frame is adapted to be lowered by means of a handle 21 and it is part of my invention to so arrange this handle that it will be locked when in its uppermost position, so that the frame will be held in its uppermost position and so that both handle and frame will be released by downward movement of the handle in the normal course which it takes when operated to lower the frame, thereby avoiding the necessity of a separate movement to unlock the handle and frame.

The handle 21 is mounted on arms 22, each arm being pivoted at 23 to two links 24 and 25, each link 25 being connected to the setter frame to actuate the same and each link 24 being pivoted to an ear 26 on the brackets 8. Each arm 22 is extended beyond the pivot 23, as plainly shown in the drawings and is provided with lugs 27 and 28 between which the link 24 is received, a certain amount of lost motion between these lugs being permitted, as best shown in Fig. 3.

Secured on the cross bar 4 is a bracket 29 having mounted therein a detent 30 pivoted at 31 and normally urged towards the left (Fig. 8) by a spring 32. In the position, as shown in Fig. 8, the detent engages the link 24 to hold it and consequently the setter frame in raised position. When the frame is to be lowered, the handle 21 is grasped and forced downwardly. Due to the fact that the link 24 is held against movement by the detent 30, the arms 22 will move about their pivots and this will cause the lug 28 to engage the detent 30 and force it back from the link 24 so as to release the same. The lug 28 will then come in contact with the edge of the link 24 and continued pivotal movement of the arms 22 will be stopped and therefore continued pressure on the handle 21 will cause the entire frame to be lowered. Raising of the frame is caused by the weights 11, but if necessary to employ the handle 21 for this purpose, the lug 27 engaging the edge of the link 24 opposite to the edge engaged by the lug 28 will permit the handle to be used for this purpose.

From the above it will be apparent that I have provided a novel and improved pin setting machine operated by weights which avoids all the disadvantages inherent in the old type of machine wherein a counterbalance was supported on cables. The machine is positive in its operation due to the intermeshing pinions and racks and due to the fact that the two pinions are mounted on one shaft. By this arrangement it is insured that the weights will operate in unison and that the movement of the weights will be exactly the same as the movement of the frame. Not only does the arrangement described insure movement in opposite directions and of at least an equal amount, as the ordinary counterweight and pulley arrangement does, but it also prevents movement of one element exceeding movement of the other, and this is not prevented by the ordinary counterweight and pulley arrangement wherein the cable easily stretches. It will also be apparent that the number of parts to get out of order is small and that the machine as a whole is of a rugged character such as will stand the severe usage to which a machine of this type is subjected. The means for locking the handle and frame in the uppermost position can be applied to either one or both sides of the machine as may be desired. This latter feature is important in that the machine is positively secured in its uppermost position and released by the same movement which is used to lower the frame. Another form of locking means which would require a separate movement or any additional work would ordinarily be disregarded or broken by the pin boys operating the machine, whereas with my arrangement no additional labor is called for. The locking means is automatic in operation. When the frame rises under the influence of the weights, it is automatically locked by the link 24 passing the detent 30 and then automatically unlocked as already described.

I am aware that changes in the form, construction and arrangement of parts may be made without departing from the spirit and without sacrificing the advantages of the invention and I reserve the right to make all such changes as fairly fall within the scope of the following claims:—

I claim:

1. A pin setting machine comprising a setter frame, a weight, said frame and said weight being mounted for vertical movement and a rack and pinion connection therebetween causing equal and opposite movements of said frame and weight.

2. A pin setting machine comprising a setter frame, a weight, racks on said frame and said weight and a pinion engaging said racks to cause equal and opposite movements of said frame and weight.

3. A pin setting machine comprising a setter frame, a weight, said frame and said weight being mounted for vertical movement, and means operatively connected to said frame and said weight and causing movement of one to move the other an equal amount in the opposite direction and preventing the movement of one exceeding the movement of the other.

4. A pin setting machine comprising a setter frame, a weight, said frame and said weight being mounted for vertical movement, and means disposed between said frame and said weight and operatively connected thereto, said means causing movement of said frame and said weight in opposite directions and equal amounts and preventing the movement of one exceeding the movement of the other.

5. A pin setting machine comprising a setter frame, a vertical rod on said frame, a weight mounted for vertical movement, racks on said weight and said rod, and a pinion engaging said racks to cause movement of said frame and said weight in opposite directions.

6. A pin setting machine comprising a setter frame, a plurality of vertical rods on said frame, an equal number of weights mounted for vertical movement adjacent said rods, said weights and rods being provided with racks, a plurality of pinions, each pinion disposed between a rod and a weight and meshing with the racks thereon, and a shaft on which said pinions are mounted.

7. A pin setting machine comprising a setter frame, a weight, said frame and said weight being mounted for vertical movement, racks on said frame and said weight, a pinion meshing with said racks, and means preventing rotation of said weight.

8. A pin setting machine comprising a setter frame, a weight, said frame and said weight being mounted for vertical movement, racks on said frame and said weight, a pinion meshing with said racks, said weight being provided with a bore, a guide rod disposed in said bore, a support for said frame and co-operating means on said support and on said weight to prevent rotation of said weight.

9. A pin setting machine comprising a setter frame mounted for vertical movement, a handle connected to said frame to lower the same, a support for said frame, locking means on said support to hold said frame in its uppermost position, and means to release said locking means and lower the frame by one movement of said handle.

10. A pin setting machine comprising a setter frame, means for raising and lowering said frame, means for automatically locking said frame when it reaches its uppermost position, and means for automatically releasing said locking means upon downward movement of said frame.

11. A pin setting machine comprising a setter frame, a handle for lowering said frame, means to engage said handle and lock said frame in its uppermost position, and means to release said lock and to lower the frame by one movement of said handle.

12. A pin setting machine comprising a support, a setter frame mounted for vertical movement on said support, a handle, an arm on said handle, two links pivoted to said arm and one connected to said support and the other to said frame, a lug on said handle, a detent on said support and engaging one of said links when said frame is in its uppermost position, movement of said handle about its pivot causing said lug to engage said detent to release it from engagement with said link.

13. A pin setting machine comprising a support, a setter frame mounted for vertical movement on said support, a handle for raising and lowering said frame, an arm on said handle, a link pivotally connected to said arm and to said support, one of said members extending past their pivotal connection and having lugs disposed on opposite sides of the other member.

14. A pin setting machine comprising a support, a setter frame mounted for vertical movement on said support, means for raising and lowering said frame, a detent on said support and securing said frame in its uppermost position, and means for releasing said detent upon downward movement of said frame.

JOSEPH W. BISHOP.